(12) United States Patent
Miyauchi et al.

(10) Patent No.: US 12,032,946 B2
(45) Date of Patent: *Jul. 9, 2024

(54) PROGRAM UPDATE SYSTEM, PROGRAM TRANSMISSION DEVICE, AND PROGRAM TRANSMISSION METHOD

(71) Applicant: TOYOTA JIDOSHA KABUSHIKI KAISHA, Toyota (JP)

(72) Inventors: Kunihiro Miyauchi, Toyota (JP); Isao Watanabe, Nagoya (JP); Hiroya Andou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,743

(22) Filed: Jun. 9, 2023

(65) Prior Publication Data

US 2023/0315436 A1 Oct. 5, 2023

Related U.S. Application Data

(63) Continuation of application No. 16/914,590, filed on Jun. 29, 2020, now Pat. No. 11,714,628.

(30) Foreign Application Priority Data

Oct. 7, 2019 (JP) .................. 2019-184535

(51) Int. Cl.
*G06F 8/65* (2018.01)
*G07C 5/00* (2006.01)
(Continued)

(52) U.S. Cl.
CPC ................ *G06F 8/65* (2013.01); *H04L 67/34* (2013.01); *H04W 4/48* (2018.02); *G07C 5/008* (2013.01)

(58) Field of Classification Search
None
See application file for complete search history.

(56) References Cited

U.S. PATENT DOCUMENTS 10,394,548 B2   8/2019 Fox
10,447,483 B1 * 10/2019 Su ..................... H04L 9/3226
(Continued)

FOREIGN PATENT DOCUMENTS

JP   2000-207681 A   7/2000
JP   2014-191574 A  10/2014
(Continued)

OTHER PUBLICATIONS

Mansor, "Don't Brick Your Car: Firmware Confidentiality and Rollback for Vehicles", 2015, 10th International Conference on Availability, Reliability and Security (Year: 2015).*
(Continued)

*Primary Examiner* — Hossain M Morshed
(74) *Attorney, Agent, or Firm* — Oliff PLC

(57) ABSTRACT

A program update system includes a vehicle including a first and second electronic devices, and a program transmission device. The program transmission device is configured to communicate with the vehicle and transmit a program for the first electronic device and a program for the second electronic device to the vehicle. The program transmission device transmits an update program for a first electronic device to a second electronic device. The program transmission device transmits a program in a state before the update for backup. The second electronic device updates the program for the first electronic device based on the update program. The second electronic device stores the program in the state before the update.

18 Claims, 4 Drawing Sheets

(51) Int. Cl.
   *H04L 67/00*   (2022.01)
   *H04W 4/48*   (2018.01)

(56) References Cited

U.S. PATENT DOCUMENTS

| | | | | |
|---|---|---|---|---|
| 10,735,260 | B2* | 8/2020 | Maeda | H04L 12/40013 |
| 2005/0256614 | A1* | 11/2005 | Habermas | B60L 3/0023 |
| | | | | 701/1 |
| 2010/0204878 | A1* | 8/2010 | Drew | B60R 16/0232 |
| | | | | 701/31.4 |
| 2012/0041638 | A1 | 2/2012 | Johnson et al. | |
| 2016/0306624 | A1 | 10/2016 | Vangelov et al. | |
| 2017/0139778 | A1* | 5/2017 | Kito | G06F 11/1433 |
| 2017/0192770 | A1 | 7/2017 | Ujiie et al. | |
| 2017/0315797 | A1* | 11/2017 | Vangelov | H04L 67/12 |
| 2018/0189049 | A1* | 7/2018 | Madrid | G06F 8/65 |
| 2019/0050219 | A1* | 2/2019 | Seki | H04L 67/12 |
| 2019/0050220 | A1 | 2/2019 | Daum et al. | |
| 2019/0193653 | A1* | 6/2019 | Nakamura | G06F 9/4893 |
| 2019/0212997 | A1* | 7/2019 | Sangameswaran | H04L 67/52 |
| 2019/0236857 | A1* | 8/2019 | Watanabe | G07B 15/02 |
| 2019/0294429 | A1* | 9/2019 | Mizutani | H04L 67/12 |
| 2019/0324858 | A1* | 10/2019 | Sarkar | H04L 67/34 |
| 2020/0050378 | A1 | 2/2020 | Sakurai et al. | |
| 2020/0183676 | A1* | 6/2020 | Sakurai | H04L 67/34 |
| 2020/0241771 | A1 | 7/2020 | Sakurai et al. | |
| 2020/0372157 | A1 | 11/2020 | Singer et al. | |
| 2021/0011709 | A1* | 1/2021 | Itatsu | B60R 16/02 |
| 2021/0155177 | A1* | 5/2021 | Harata | B60R 16/0231 |
| 2021/0157902 | A1 | 5/2021 | Sakurai et al. | |

FOREIGN PATENT DOCUMENTS

| | | |
|---|---|---|
| JP | 2017-097851 A | 6/2017 |
| JP | 2019-074847 A | 5/2019 |

OTHER PUBLICATIONS

Nice, "How car computer work", 2021, HowStuffWorks (Year: 2021).

* cited by examiner

PROGRAM UPDATE SYSTEM, PROGRAM TRANSMISSION DEVICE, AND PROGRAM TRANSMISSION METHOD

INCORPORATION BY REFERENCE

This is a Continuation application of U.S. patent application Ser. No. 16/914,590 filed on Jun. 29, 2020, which claims the benefit of Japanese Patent Application No. 2019-184535 filed on Oct. 7, 2019. The entire disclosures of the prior applications are incorporated herein by reference in their entirety.

BACKGROUND

1. Technical Field

The disclosure relates to a program update system for updating a program for an electronic device included in a network system mounted on a vehicle and the like, a program transmission device, and a program transmission method.

2. Description of Related Art

A vehicle is equipped with a network system in which a plurality of electronic devices called electronic control units (ECUs) are connected to each other via communication lines. The electronic devices transmit and receive messages to and from each other, and execute the functions of the vehicle in a shared manner.

An electronic device typically includes a processor and a transitory storage unit such as a random-access memory (RAM) and a non-volatile storage unit such as a flash read-only memory (ROM). A program executed by the processor is stored in the non-volatile storage unit. The functions of the electronic device can be improved by rewriting and updating the program to a newer version.

Japanese Unexamined Patent Application Publication No. 2014-191574 (JP 2014-191574 A) discloses that, when updating a program for a first electronic device, a second electronic device reads and stores the program currently stored in the first electronic device via a communication line for in-vehicle communication to perform backup prior to the update. According to this method, the second electronic device writes the program back to the first electronic device, so that the program for the first electronic device can be restored to the state before the update even when the storage unit of the first electronic device does not have a storage area for backup.

SUMMARY

In the method described in JP 2014-191574 A, the second electronic device reads the program currently stored in the first electronic device via the communication line for in-vehicle communication of a network system and performs backup. Thus, the communication amount in the vehicle increases as compared with the case in which no backup is performed.

The disclosure allows, in a program update system for updating a program for an electronic device of a vehicle, the program to be restored to the state before the update while suppressing an increase in the communication amount in the vehicle even when the electronic device to be updated does not have a backup storage area.

A first aspect of the disclosure relates to a program update system. The program update system includes a vehicle and a program transmission device. The vehicle includes a first electronic device and a second electronic device. The program transmission device configured to communicate with the vehicle and transmit a program for the first electronic device and a program for the second electronic device to the vehicle. The second electronic device is configured to store data received from the program transmission device. The first electronic device does not have a sufficient storage area to simultaneously store a current program that is a current version of a program to be executed by the first electronic device and an update program that is an updated version of the current program. The second electronic device is configured to communicate with the program transmission device and the first electronic device, and has a sufficient storage area to simultaneously store the current program and the update program. The program transmission device is configured to transmit, upon receiving a request from the vehicle, data representing the update program and data representing the current program to the vehicle. The second electronic device is configured to store, upon receiving the data representing the update program and the data representing the current program, the data representing the update program and the data representing the current program. The second electronic device is configured to execute an update process of changing a program stored in the first electronic device from the current program to the update program based on the data representing the update program stored in the second electronic device. The second electronic device is configured to execute, after the update process, a restoration process for restoring the program stored in the first electronic device to the current program based on a result of a predetermined determination process or a user's instruction, using the data representing the current program stored in the second electronic device.

In the program update system of the above aspect, the data representing the update program may be data representing a difference between the update program and the current program.

In the program update system of the above aspect, the data representing the current program may be data representing a difference between the current program and the update program.

In the program update system of the above aspect, the second electronic device may be configured to delete the current program stored in the second electronic device after power of the vehicle is turned on and then turned off at least once, after execution of the update process.

In the program update system of the above aspect, the predetermined determination process may be performed based on an operation of the first electronic device while the power of the vehicle is on.

In the program update system of the above aspect, the first electronic device may be configured to perform a predetermined operation test, after execution of the update process, using the updated program, as the predetermined determination process, while the power of the vehicle is off, and the second electronic device may be configured to execute the restoration process when a result of the predetermined operation test falls outside an allowable range.

A second aspect of the disclosure relates to a program transmission device for transmitting a program for an electronic device mounted in a vehicle. The program transmission device includes a communication unit configured to communicate with the vehicle, and a controller configured to control the communication unit. The controller configured to control the communication unit, when the communication unit receives a request from the vehicle, the controller controls, the communication unit such that the communication unit transmits data representing a current program that is a current version of a program to be executed by the electronic device and data representing an update program that is an updated version of the current program to the vehicle.

A third aspect of the disclosure relates to a program transmission method executed by a controller of a program transmission device including a communication unit for communicating with a vehicle and configured to transmit a program for an electronic device mounted in the vehicle. The program transmission method includes controlling, by the controller, when the communication unit receives a request from the vehicle, the communication unit such that the communication unit transmits data representing a current program that is a current version of a program to be executed by the electronic device and data representing an update program that is an updated version of the current program to the vehicle based on the request.

According to the disclosure, in a program update system for updating a program for an electronic device of a vehicle, the program can be restored to the state before update while suppressing an increase in the communication amount in the vehicle even when the electronic device to be updated does not have a backup storage area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

In an embodiment of the disclosure, when a server that is a program transmission device transmits an update program for a first electronic device to a second electronic device of a vehicle, the server also transmits a program in a state before the update for backup. The first electronic device does not have a storage area for performing backup of the program in the state before the update, and instead the second electronic device stores the program in the state before the update. The second electronic device receives the program in the state before the update from the server, so the second electronic device does not need to read the program in the state before the update from the first electronic device. Therefore, the program for the first electronic device can be restored to the program in the state before the update while suppressing an increase in the communication amount in the vehicle.

Configurations

Figure 1:
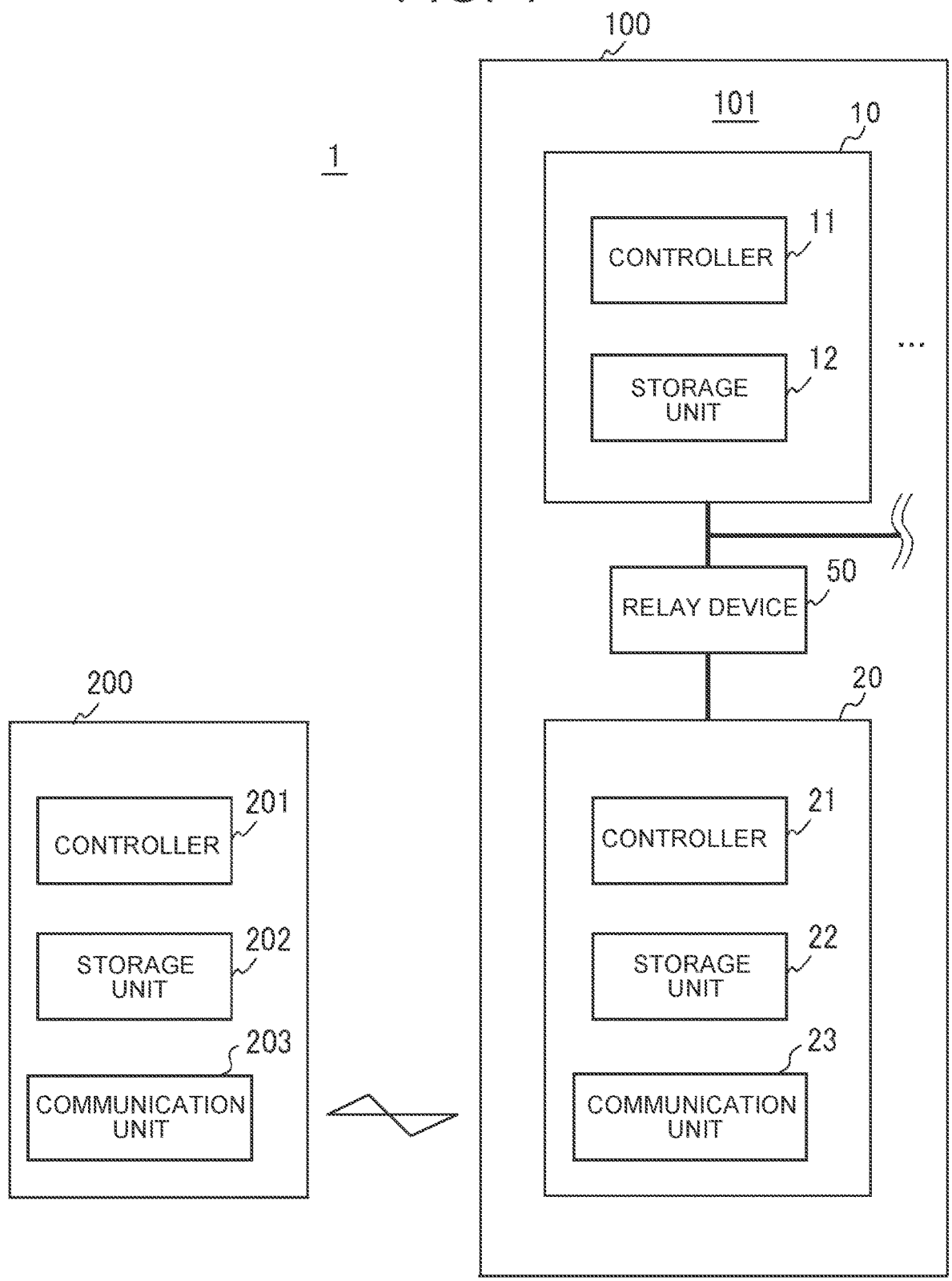
FIG. 1 is a configuration diagram of a program update system according to an embodiment of the disclosure.

FIG. 1 shows a configuration of a program update system 1 according to the present embodiment. The program update system 1 includes a vehicle 100 on which a network system 101 is mounted, and a server 200 provided outside the vehicle 100.

The network system 101 includes a plurality of electronic devices. FIG. 1 shows a first electronic device 10 and a second electronic device 20 as examples. For example, the second electronic device 20 is connected to the first electronic device 10 and other electronic devices (not shown) via a relay device 50.

The first electronic device 10 includes a controller 11 and a storage unit 12. The storage unit 12 stores a program for implementing the function of the first electronic device 10, and the controller 11 reads the program from the storage unit 12 and executes the program. The storage unit 12 has a limited storage capacity and does not have a sufficient storage area to store both a current program, which is a program currently stored, and an update program, which is a new version of the current program. In the present embodiment, programs of the first electronic device 10 or other electronic devices having the same configuration as the configuration of the first electronic device 10 can be updated.

The second electronic device 20 includes a controller 21, a storage unit 22, and a communication unit 23. The storage unit 22 stores a program for implementing the function of the second electronic device 20, and the controller 21 reads the program from the storage unit 22 and executes the program. In the present embodiment, the second electronic device 20 performs a process related to updating a program for the first electronic device 10 and the like. The storage unit 22 has a sufficient storage area to store the update program and the current program to be updated of each electronic device, in addition to the program for the second electronic device 20. The communication unit 23 is a wireless communication device for communicating with the server 200. The communication unit 23 may be provided separately from the second electronic device 20.

The server 200 is a program transmission device including a controller 201, a storage unit 202, and a communication unit 203. The storage unit 202 stores a program for implementing the function of the server 200, and the controller 201 reads the program from the storage unit 202 and executes the program. The server 200 can provide the update program for each electronic device. The storage unit 202 has a sufficient storage area to store the program for each version of each electronic device in addition to the program for the server 200. The communication unit 203 is a wireless communication device for communicating with the second electronic device 20. As described above, the communication between the server 200 and the second electronic device 20 is typically performed wirelessly, but may be performed via wires. In the present embodiment, instead of the server 200, a general-purpose terminal device such as a smartphone or a dedicated portable terminal device having equivalent functions may be used.

The first electronic device 10 and the second electronic device 20 each include a communication unit for in-vehicle communication controlled by the controller 11 and the controller 21 for communicating with each other via a communication line. The communication units are omitted in FIG. 1.

Processes

Figure 2:
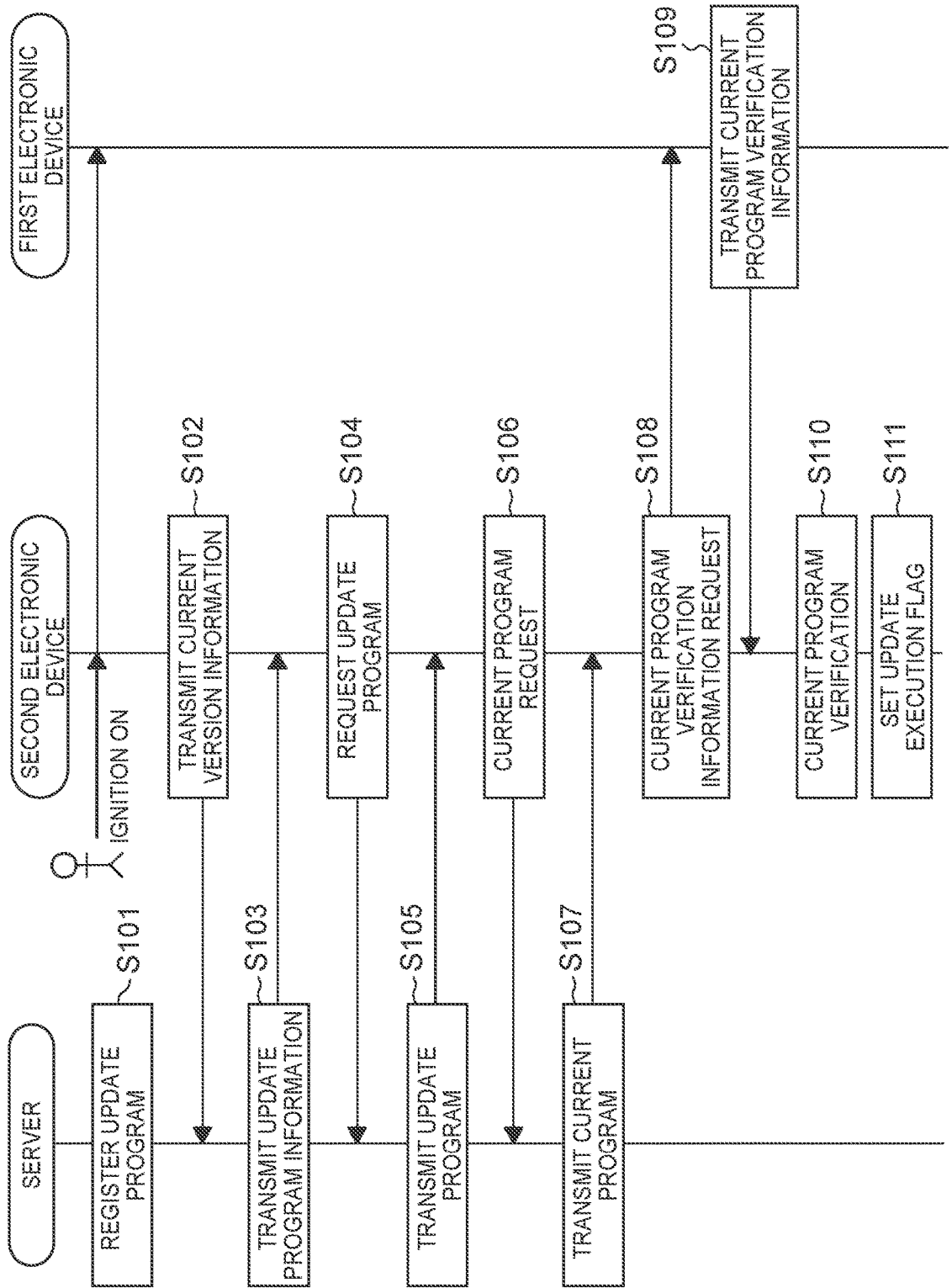
FIG. 2 is a sequence diagram showing a process according to the embodiment of the disclosure.
Figure 3:
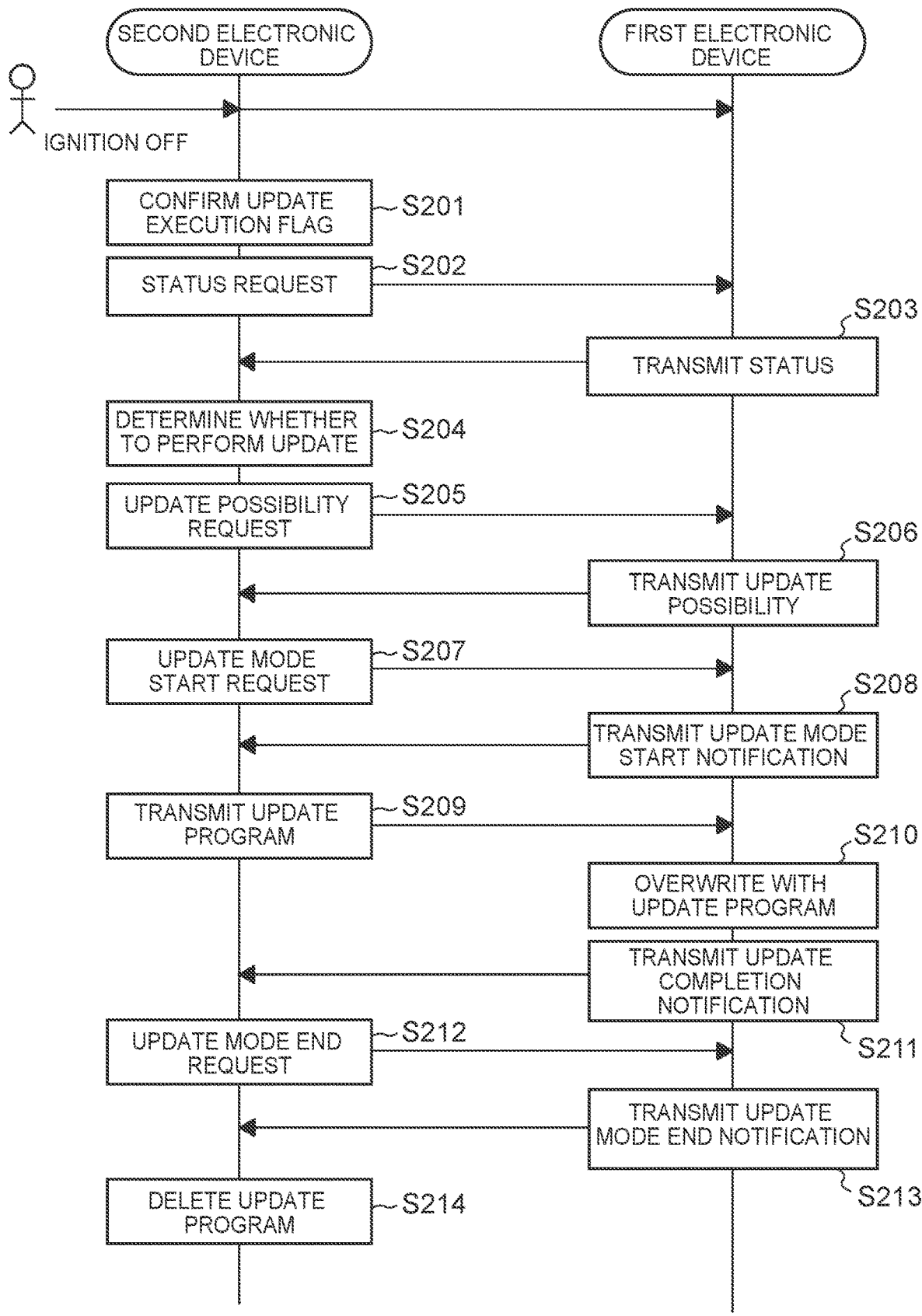
FIG. 3 is a sequence diagram showing a process according to the embodiment of the disclosure.
Figure 4:
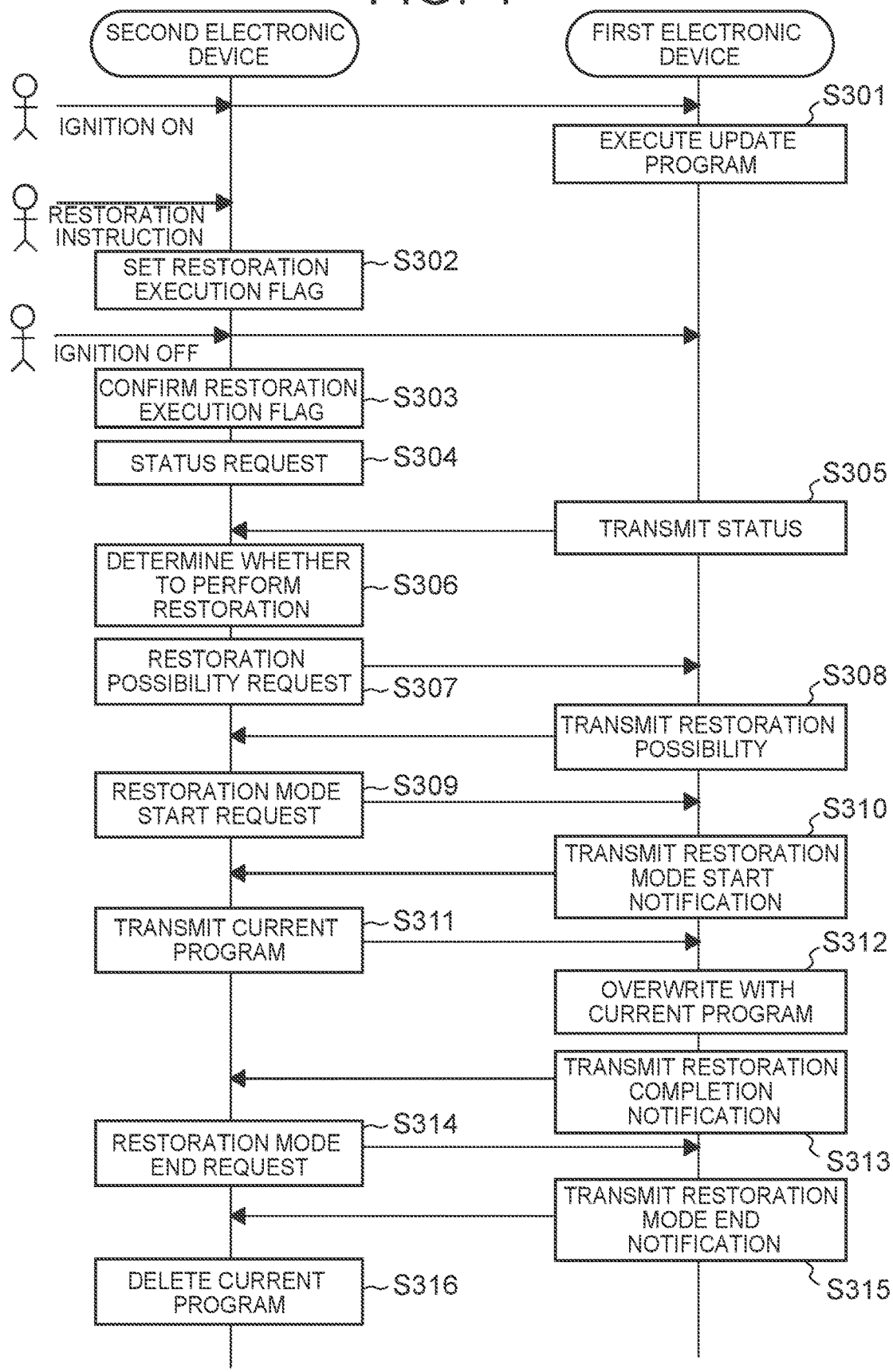
FIG. 4 is a sequence diagram showing a process according to the embodiment of the disclosure.

Hereinafter, processes according to the present embodiment will be described. FIGS. 2, 3, and 4 are sequence diagrams showing examples of the processes. In this example, the program for the first electronic device 10 is set as an update target. The same processes can be performed even when a program for another electronic device is the update target. Further, even when programs of a plurality of electronic devices are the update targets, the same processes can be appropriately performed for each electronic device.

First, a process in which the second electronic device 20 acquires the update program and the current program will be described with reference to FIG. 2.

Step S101

An update program for the first electronic device 10 is provided to the server 200 and registered in the server 200. The update program is provided from, for example, a provider device or a storage medium. The controller 201 of the server 200 causes the storage unit 202 to store the update program.

The subsequent process in steps S102 to S111 is executed while the power of the vehicle 100 is on (the vehicle is in an ignition on state) by a user's operation.

Step S102

The controller 21 of the second electronic device 20 generates information specifying the version of each program for the electronic device included in the network system 101, and controls the communication unit 23 such that the communication unit 23 transmits the information to the server 200. In this example, the information includes information that specifies the version of the program for the first electronic device 10.

Step S103

When the communication unit 203 receives the information specifying the version of each program, the controller 201 of the server 200 generates, based on the received information and the update program stored in the storage unit 202, information indicating whether there is an update program for each electronic device, and controls the communication unit 203 such that the communication unit 203 transmits the information to the second electronic device 20. In this example, the information includes information indicating that there is an update program for the first electronic device 10.

Step S104

When the communication unit 23 receives the information indicating that there is an update program, the controller 21 of the second electronic device 20 controls the communication unit 23 such that the communication unit 23 sends an update program request to the server 200. In this example, the update program request includes information for requesting an update of the program for the first electronic device 10. Alternatively, the controller 21 may execute this step and the subsequent steps when the controller 21 displays information indicating that there is the update program on a display device mounted on the vehicle 100 and receives an instruction from the user via an interface such as a graphical user interface (GUI) to acquire the update program.

Step S105

When the communication unit 203 receives the update program request, the controller 201 of the server 200 reads the update program from the storage unit 202 and controls the communication unit 203 such that the communication unit 203 transmits the update program to the second electronic device 20. In this example, a program including the update program for the first electronic device 10 is transmitted. When the communication unit 23 receives the update program, the controller 21 of the second electronic device 20 causes the storage unit 22 to store the update program.

Step S106

The controller 21 of the second electronic device 20 controls the communication unit 23 such that the communication unit 23 transmits a current program request to the server 200. In this example, the current program request includes information for requesting the current program for the first electronic device 10.

Step S107

When the communication unit 203 receives the current program request, the controller 201 of the server 200 reads the current program from the storage unit 202 and controls the communication unit 203 such that the communication unit 203 transmits the current program to the second electronic device 20. In this example, the current program for the first electronic device 10 is transmitted. When the communication unit 23 receives the current program, the controller 21 of the second electronic device 20 causes the storage unit 22 to store the current program. Instead of being transmitted in response to the current program request, the current program may be transmitted followed by the transmission of the update program in step S105 or subsequent to the transmission of the update program in step S105.

Step S108

The controller 21 of the second electronic device 20 transmits a current program verification information request to the first electronic device 10.

Step S109

The controller 11 of the first electronic device 10 generates current program verification information and transmits the current program verification information to the second electronic device 20. The current program verification information is information for verification, which is determined based on the current program stored in the storage unit 12 of the first electronic device 10, and is, for example, a cyclic redundancy check (CRC) value.

Step S110

The controller 21 of the second electronic device 20 generates verification information of the current program received from the server 200, or acquires the verification information together with the current program from the server 200. The controller 21 then compares the generated or acquired verification information with the current program verification information received from the first electronic device 10 to verify that the current program received from the server 200 is the same as the current program stored in the storage unit 12 of the first electronic device 10. When it is not verified that the current program received from the server 200 is the same as the current program stored in the storage unit 12 of the first electronic device 10, the subsequent process is not performed.

Step S111

The controller 21 of the second electronic device 20 sets an update execution flag to ON.

With the above process, the second electronic device 20 acquires the update program for the first electronic device 10 and the current program for backup, and thus is in a state where the second electronic device 20 can proceed to the next update process.

Next, a program update process will be described with reference to FIG. 3. The process in steps S201 to S214 is executed while the power of the vehicle 100 is off (the vehicle is in an ignition off state) by a user's operation.

Step S201

The controller 21 of the second electronic device 20 confirms that the update execution flag is set to ON. When this confirmation cannot be made, the subsequent process is not performed.

Step S202

The controller 21 of the second electronic device 20 transmits a status request to the first electronic device 10. Alternatively, the controller 21 may execute this step and the subsequent steps when the controller 21 displays a confirmation screen on the display device as to whether to update the program and receives an instruction from the user via an interface such as the GUI to execute the update.

Step S203

The controller 11 of the first electronic device 10 transmits information indicating the status of the first electronic device 10 to the second electronic device 20. The controller 11 of the first electronic device 10 can execute a self-diagnosis and detect whether there is an abnormality or a failure as a status of the first electronic device 10. The information indicating the status of the first electronic device 10 includes this detection result.

Step S204

The controller 21 of the second electronic device 20 determines whether to perform the subsequent process based on the status of the first electronic device 10. When an abnormality or a failure has occurred in the first electronic device 10, the subsequent process is not performed.

Step S205

The controller 21 of the second electronic device 20 transmits an update possibility request to the first electronic device 10.

Step S206

The controller 11 of the first electronic device 10 transmits information indicating whether the update can be performed to the second electronic device 20. The controller 11 of the first electronic device 10 can determine whether the process of updating the program by rewriting the program stored in the storage unit 12 can be currently executed based on the operation status of the first electronic device 10. The information indicating whether the update can be performed includes this determination result.

Step S207

Upon receiving the information indicating that the update can be performed, the controller 21 of the second electronic device 20 transmits an update mode start request to the first electronic device 10. When the controller 21 of the second electronic device 20 does not receive the information indicating that the update can be performed, the subsequent process is not performed.

Step S208

The controller 11 of the first electronic device 10 starts the update mode as an operation status, and transmits an update mode start notification indicating the start of the update mode to the second electronic device 20.

Step S209

The controller 21 of the second electronic device 20 reads the update program from the storage unit 22, and transmits the update program to the first electronic device 10.

Step S210

The controller 11 of the first electronic device 10 overwrites a program in a program storage area of the storage unit 12 with the update program received from the second electronic device 20.

Step S211

When the writing of the update program on the storage unit 12 is completed, the controller 11 of the first electronic device 10 transmits an update completion notification to the second electronic device 20.

Step S212

Upon receiving the update completion notification, the controller 21 of the second electronic device 20 transmits an update mode end request to the first electronic device 10.

Step S213

The controller 11 of the first electronic device 10 ends the update mode, and transmits an update mode end notification indicating the end of the update mode to the second electronic device 20.

Step S214

The controller 21 of the second electronic device 20 deletes the update program stored in the storage unit 22.

With the above process, the program for the first electronic device 10 is updated. When the controller 21 of the second electronic device 20 does not receive the update completion notification in step S211 for a certain period of time or receives an error notification based on the diagnosis of the controller 11 of the first electronic device 10 instead of the update completion notification, the controller 21 of the second electronic device 20 may determine that the update has failed and, for example, may retransmit the update program. Alternatively, instead of the update program, the controller 21 of the second electronic device 20 may transmit the current program stored in the storage unit 22, rewrite the stored content of the storage unit 12 of the first electronic device 10 with the current program, and stop the update. In step S214, the controller 21 of the second electronic device 20 may control the communication unit 23 such that the communication unit 23 transmits a notification indicating that the update of the program has ended to the server 200. Further, after the update is successfully completed, when there is no need to return the updated program to the original current program and a restoration process described later is not performed, in step S214, the controller 21 of the second electronic device 20 may delete the current program stored in the storage unit 22.

Next, the restoration process for returning the updated program to the original program after the update is completed will be described with reference to FIG. 4. The process in steps S301 and S302 is executed while the power of the vehicle 100 is on (the vehicle is in an ignition on state) by a user's operation.

Step S301

The controller 11 of the first electronic device 10 reads the update program from the storage unit 12 and executes the update program.

Step S302

The controller 21 of the second electronic device 20 sets a restoration execution flag. This process is executed, for example, when a restoration instruction is received from the user via an interface such as the GUI on the display screen. For example, when the user is dissatisfied with the function provided by the update program executed by the controller 11 of the first electronic device 10, the user can make the restoration instruction. Alternatively, instead of the user, the first electronic device 10 or another electronic device may make the restoration instruction based on a predetermined determination process. In the determination process, for example, the restoration instruction may be made when, as a result of the update program actually executed by the controller 11 of the first electronic device 10, an effect falling outside a predetermined allowable range is generated in the operation of the vehicle 100 or any of the electronic devices.

The process in the following steps S303 to S316 is executed while the power of the vehicle 100 is off (the vehicle is in an ignition off state) by a user's operation.

Step S303

The controller 21 of the second electronic device 20 confirms that the restoration execution flag is set to ON. When this confirmation cannot be made, the subsequent process is not performed.

Step S304

The controller 21 of the second electronic device 20 transmits a status request to the first electronic device 10.

Step S305

The controller 11 of the first electronic device 10 transmits information indicating the status of the first electronic device 10 to the second electronic device 20. The controller 11 of the first electronic device 10 can execute a self-diagnosis and detect whether there is an abnormality or a failure as a status of the first electronic device 10. The information indicating the status of the first electronic device 10 includes this detection result.

Step S306

The controller 21 of the second electronic device 20 determines whether to perform the subsequent process based on the status of the first electronic device 10. When an abnormality or a failure has occurred in the first electronic device 10, the subsequent process is not performed.

Step S307

The controller 21 of the second electronic device 20 transmits a restoration possibility request to the first electronic device 10.

Step S308

The controller 11 of the first electronic device 10 transmits information indicating whether restoration is possible to the second electronic device 20. The controller 11 of the first electronic device 10 can determine whether the process of rewriting the program stored in the storage unit 12 to restore the program can be currently executed based on the operation status of the first electronic device 10. The information indicating whether the restoration is possible includes this determination result.

Step S309

Upon receiving the information indicating that the restoration is possible, the controller 21 of the second electronic device 20 transmits a restoration mode start request to the first electronic device 10. When the controller 21 of the second electronic device 20 does not receive the information indicating that the restoration is possible, the subsequent process is not performed.

Step S310

The controller 11 of the first electronic device 10 starts the restoration mode as an operation status, and transmits a restoration mode start notification indicating the start of the restoration mode to the second electronic device 20.

Step S311

The controller 21 of the second electronic device 20 reads the current program from the storage unit 22 as a restoration program, and transmits the restoration program to the first electronic device 10.

Step S312

The controller 11 of the first electronic device 10 overwrites the program in the program storage area of the storage unit 12 with the restoration program received from the second electronic device 20.

Step S313

When the writing of the restoration program on the storage unit 12 is completed, the controller 11 of the first electronic device 10 transmits a restoration completion notification to the second electronic device 20.

Step S314

Upon receiving the restoration completion notification, the controller 21 of the second electronic device 20 transmits a restoration mode end request to the first electronic device 10.

Step S315

The controller 11 of the first electronic device 10 ends the restoration mode, and transmits a restoration mode end notification indicating the end of the restoration mode to the second electronic device 20.

Step S316

The controller 21 of the second electronic device 20 deletes the current program stored in the storage unit 22. The controller 21 of the second electronic device 20 may control the communication unit 23 such that the communication unit 23 transmits a notification indicating that the restoration of the program has ended to the server 200.

With the above process, the program for the first electronic device 10 is restored. In this example, the restoration instruction can be made based on the operation of the first electronic device 10 when the power is turned on and its effect. As described above, when the power of the vehicle is turned on from the power-off state at least once and the first electronic device 10 acquires one or more results of the execution of the update program, the restoration instruction can be made based on the result of the actual execution of the update program. Alternatively, in the power-off state after step S214, the first electronic device 10 may perform a predetermined operation test using the updated program as a determination process, and make a restoration instruction when the result falls outside the allowable range. In this case, the process in step S303 and the subsequent steps may be executed without shifting to the power-on state.

The process according to the present embodiment has been described above, but each process can be appropriately modified. For example, instead of transmitting the update program or the current program to the second electronic device 20, the server 200 may transmit data in another format representing the update program or the current program as appropriate. Other formats of the data are not limited. For example, instead of the update program, data representing the difference between the update program and the current program may be used, and instead of the current program, data representing the difference between the current program and the update program may be used. Further, the data may be compressed data of an update program, a current program, or difference data. Moreover, the format of the update program or the current program transmitted from the second electronic device 20 to the first electronic device 10 is not limited. The second electronic device 20 may transmit the data received from the server 200 as it is, and alternatively, the second electronic device 20 may transmit data obtained by converting the data received from the server 200, such as data obtained by developing compressed data or data representing a program constructed based on the difference data.

Effects

In the present embodiment, when the server 200 transmits the update program for the first electronic device 10 to the second electronic device 20, the server 200 also transmits the program in the state before the update for backup. The first electronic device 10 does not have a storage area for performing backup of the program in the state before the update, and the second electronic device 20 stores the program in the state before the update instead. Since the second electronic device 20 receives the program in the state before the update from the server 200, there is no need to read the program in the state before the update from the first electronic device 10. Therefore, the first electronic device 10 can be restored to the program in the state before the update as necessary while suppressing an increase in the communication amount in the vehicle.

Suppression in the increase in the communication amount in the vehicle restrains the communication band of the communication lines for in-vehicle communication from being narrowed, and thus suppresses the risk of causing troubles in communication between electronic devices. The communication speed between an external device such as the server 200 and the electronic devices in the vehicle 100 is generally faster than the communication speed between the electronic devices in the vehicle 100. Thus, when the second electronic device 20 receives the update program from the server 200, the total time required for updating the program can be reduced as compared with the case where the update program is read from the first electronic device 10.

The disclosure can be applied to a program update system, a program transmission device and a program transmission method, a method executed by a computer provided in each part of the program update system, a program and a computer-readable non-transitory storage medium storing the program, and a vehicle equipped with a network system included in a program update system.

The disclosure is useful for a program update system of an electronic device mounted on a vehicle and the like.

What is claimed is:

1. A program update system comprising:
a vehicle including a first electronic device and a second electronic device; and
a program transmission device configured to communicate with the vehicle and transmit a program for the first electronic device to the vehicle, wherein
the second electronic device is configured to store data received from the program transmission device,
the first electronic device does not have a sufficient storage area to simultaneously store a current program that is a current version of a program to be executed by the first electronic device and an update program that is an updated version of the current program,
the second electronic device is configured to communicate with the program transmission device and the first electronic device, and has a sufficient storage area to simultaneously store the current program and the update program,
the program transmission device is configured to transmit, upon receiving a request from the vehicle, first data representing the current program and second data representing the update program to the vehicle,
the second electronic device is configured to receive and store the first data and the second data,
the second electronic device is configured to be able to execute an update process of changing a program stored in the first electronic device from the current program to the update program based on the second data stored in the second electronic device,
the second electronic device is configured to be able to execute, after the update process, a restoration process for restoring the program stored in the first electronic device to the current program from the update program, based on the first data stored in the second electronic device,
the second electronic device is configured to keep holding the first data even after execution of the update process, and
the second electronic device is configured to delete the first data representing the current program in response to a completion of the restoration process for restoring the program stored in the first electronic device to the current program from the update program.

2. The program update system according to claim 1, wherein the restoration process is performed in response to a user's instruction to initiate the restoration process.

3. The program update system according to claim 1, wherein the first electronic device is configured to perform a predetermined operation test, after execution of the update process, and the second electronic device is configured to execute the restoration process when a result of the predetermined operation test falls outside an allowable range.

4. The program update system according to claim 1, wherein the second data representing the update program is data representing a difference between the update program and the current program.

5. The program update system according to claim 1, wherein the first data representing the current program is data representing a difference between the current program and the update program.

6. The program update system according to claim 1, wherein the second electronic device is configured to delete the second data in response to a completion of the update process.

7. A vehicle comprising:
a first electronic device; and
a second electronic device, wherein
the first electronic device does not have a sufficient storage area to simultaneously store a first program to be executed by the first electronic device and a second program that is an updated version of the first program,
the second electronic device has a sufficient storage area to simultaneously store the first program and the second program,
the second electronic device is configured to be able to:
receive and store first data representing the first program and second data representing the second program,
execute an update process of changing a program stored in the first electronic device from the first program to the second program based on the second data stored in the second electronic device,
execute, after the update process, a restoration process for restoring the program stored in the first electronic device to the first program from the second program, using the first data stored in the second electronic device,
keep holding the first data even after execution of the update process, and
delete the first data representing the first program in response to a completion of the restoration process for restoring the program stored in the first electronic device to the first program from the second program.

8. The vehicle according to claim 7, wherein the restoration process is performed in response to a user's instruction to initiate the restoration process.

9. The vehicle according to claim 7, wherein the first electronic device is configured to perform a predetermined operation test, after execution of the update process, and the second electronic device is configured to execute the restoration process when a result of the predetermined operation test falls outside an allowable range.

10. The vehicle according to claim 7, wherein the second data representing the second program is data representing a difference between the second program and the first program.

11. The vehicle according to claim 7, wherein the first data representing the first program is data representing a difference between the first program and the second program.

12. The vehicle according to claim 7, wherein the second electronic device is configured to delete the second data in response to a completion of the update process.

13. A method of controlling a program update system comprising:
controlling a program transmission device to communicate with a vehicle that includes a first electronic device and a second electronic device, and transmit a program for the first electronic device to the vehicle, wherein the first electronic device does not have a sufficient storage area to simultaneously store a current program that is a current version of a program to be executed by the first electronic device and an update program that is an updated version of the current program, and the second electronic has a sufficient storage area to simultaneously store the current program and the update program,
controlling the vehicle such that:
the vehicle requests and receives, from the program transmission device, first data representing the current program and second data representing the update program,
the second electronic device stores the first data and the second data,
the second electronic device executes an update process of changing a program stored in the first electronic device from the current program to the update program based on the second data stored in the second electronic device,
the second electronic device executes, after the update process, a restoration process for restoring the program stored in the first electronic device to the current program from the update program, based on the first data stored in the second electronic device,
the second electronic device keeps holding the first data even after execution of the update process, and
the second electronic device deletes the first data representing the current program in response to a completion of the restoration process for restoring the program stored in the first electronic device to the current program from the update program.

14. The method of controlling a program update system according to claim 13, wherein the restoration process is performed in response to a user's instruction to initiate the restoration process.

15. The method of controlling a program update system according to claim 13, wherein the first electronic device performs a predetermined operation test, after execution of the update process, and the second electronic device executes the restoration process when a result of the predetermined operation test falls outside an allowable range.

16. The method of controlling a program update system according to claim 13, wherein the second data representing the update program is data representing a difference between the update program and the current program.

17. The method of controlling a program update system according to claim 13, wherein the first data representing the current program is data representing a difference between the current program and the update program.

18. The method of controlling a program update system according to claim 13, wherein the second electronic device deletes the second data in response to a completion of the update process.

* * * * *